United States Patent [19]
Marinoni et al.

[11] Patent Number: 5,392,630
[45] Date of Patent: Feb. 28, 1995

[54] UNIT AND METHOD FOR FEEDING SEMIFINISHED PARTS ON TO A FORMING MACHINE, PARTICULARLY A PRESS

[75] Inventors: Giorgio Marinoni, Turin; Arturo Baroncelli, Caraglio, both of Italy

[73] Assignee: Comau S.p.A., Grugliasco, Italy

[21] Appl. No.: 954,562

[22] Filed: Sep. 30, 1992

[30] Foreign Application Priority Data

Oct. 1, 1991 [IT] Italy ............... TO91A000740

[51] Int. Cl.⁶ ........................................... B21D 43/11
[52] U.S. Cl. ................................. 721/420; 414/797; 72/424
[58] Field of Search ............ 72/420, 421, 424, 11, 72/12; 414/797, 796.9

[56] References Cited

U.S. PATENT DOCUMENTS 5,182,936  2/1993  Sartorio ............................... 72/420

FOREIGN PATENT DOCUMENTS

| | | |
|---|---|---|
| 0094608 | 11/1983 | European Pat. Off. . |
| 0031822 | 2/1983 | Japan ................... 414/797 |
| 58-042533 | 3/1983 | Japan . |
| 60-216937 | 10/1985 | Japan . |
| 0305716 | 12/1990 | Japan ................... 414/797 |
| 0005029 | 1/1991 | Japan ................... 72/424 |
| 0023114 | 1/1991 | Japan ................... 414/797 |
| 3193226 | 8/1991 | Japan ................... 414/797 |
| 1294430 | 3/1987 | U.S.S.R. ............... 72/424 |
| 1375387 | 2/1988 | U.S.S.R. ............... 72/424 |
| 1524959 | 11/1989 | U.S.S.R. ............... 72/424 |
| 86/00102 | 9/1986 | WIPO . |

*Primary Examiner*—Daniel C. Crane
*Attorney, Agent, or Firm*—Wolf, Greenfield & Sacks

[57] ABSTRACT

A semifinished part feed unit having an indexing table for transferring a stack of semifinished parts from a loading station to a pickoff station; a robot handling fixture for transferring one part at a time from the pickoff station to a press; a detecting device for detecting the characteristics and the position assumed by the stack in the pickoff station; and a control and processing system for generating control signals for the handling fixture in response to input signals from the detecting device.

15 Claims, 3 Drawing Sheets

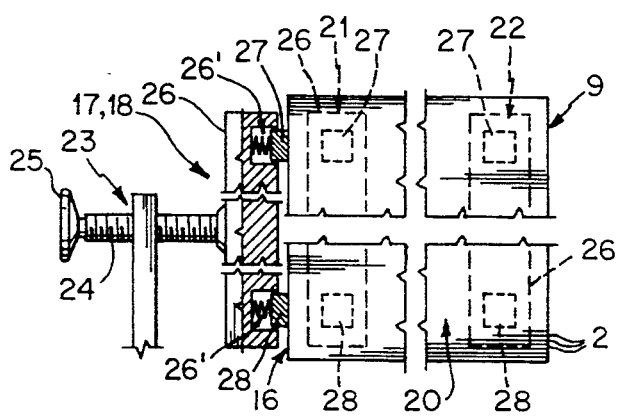
Fig. 4
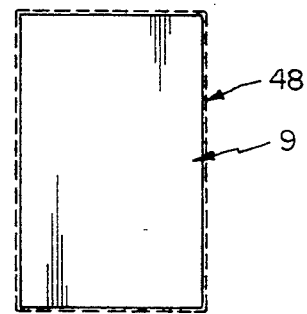
Fig. 5a
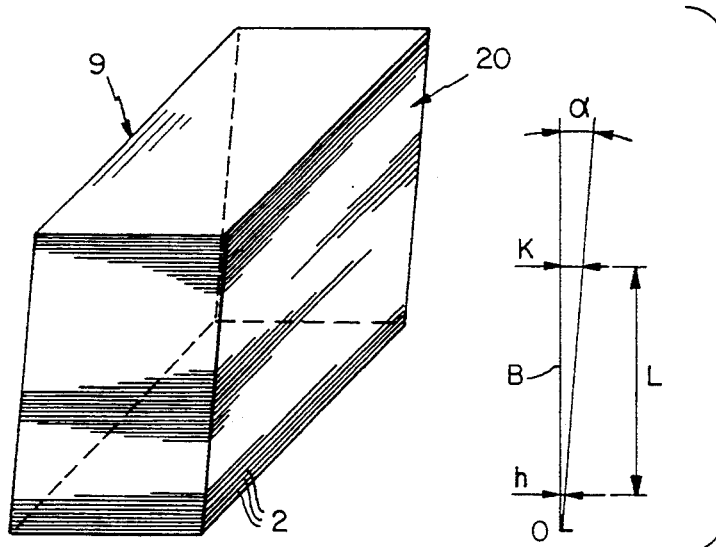
Fig. 5b
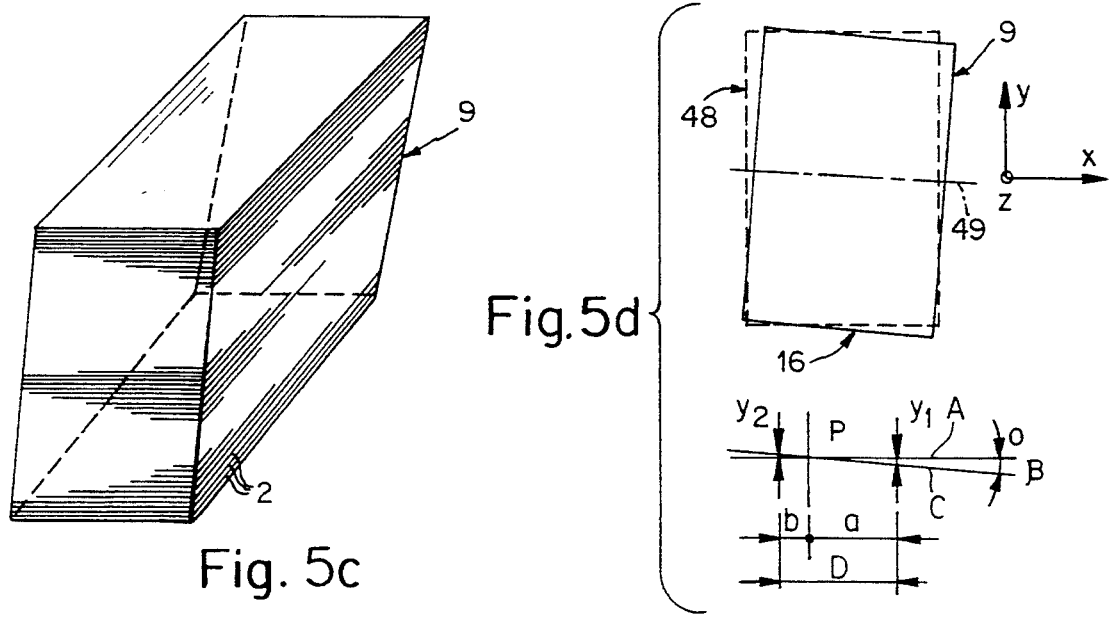
Fig. 5c
Fig. 5d

UNIT AND METHOD FOR FEEDING SEMIFINISHED PARTS ON TO A FORMING MACHINE, PARTICULARLY A PRESS

BACKGROUND OF THE INVENTION

The present invention relates to a unit and method for feeding semifinished parts on to a forming machine, particularly a press.

More specifically, the present invention relates to a continuous, slidefree feed unit for stacked, possibly preshaped, sheet metal blanks.

Most units for continuously feeding stacked blanks on to a press comprise a pickoff device, a blank locating device, and a robot handling fixture for transferring the blank from the locating device on to the press.

The pickoff device normally comprises two or more pairs of magnets usually located along the edge of the blanks stacked in a loading station, and which cooperate with a robot handling fixture for transferring the blank on to the locating device.

Though widely used and satisfactory from the operating standpoint, known feed units of the aforementioned type present several drawbacks.

Foremost of these is the size of the unit, which only enables it to be employed for feeding isolated presses, or on-line presses for which relatively ample floor space is provided in front of the press. Secondly, stations of the type briefly described above involve relatively high construction and running costs, by virtue of featuring at least two robot handling fixtures between the devices on the unit, and as many control systems for enabling dialoging between the robot fixtures and devices.

Thirdly, the flexibility of such stations is invariably poor, especially as regards automatic adjustment to changes in the configuration and location of the stack at the loading station. In most cases, in fact, no sensors are provided for detecting, for example, lateral shifting of the stack from the vertical position during transport, or mutual shifting of the blanks within the stack itself. As such, stations of the aforementioned type require the full-time attendance of one or more control operators, as well as auxiliary stacking devices, thus further increasing the cost of the unit.

SUMMARY OF THE INVENTION

It is an object of the present invention to provide a unit for feeding stacked semifinished parts on to a press, designed to overcome the aforementioned drawbacks, and which in particular is of compact design and provides for adjusting automatically to changes in the configuration and location of the stack at the loading station.

It is a further object of the present invention to provide a method enabling semifinished parts to be fed continuously on to a press, regardless of the position of the parts, at the pickoff station, in relation to a given reference position.

According to the present invention, there is provided a unit for feeding semifinished parts on to a forming machine, in particular a press, said unit comprising pickoff means for withdrawing one part at a time off a stack at a pickoff station; and first transfer means for transferring said part from said pickoff station to the forming machine; characterized by the fact that it comprises means for detecting geometric parameters of said stack, and the position assumed by said stack in the pickoff station; control and processing means being provided for generating signals for controlling said first transfer means in response to input signals from said detecting means.

According to the present invention, there is also provided a method of feeding semifinished parts to a forming machine, particularly a press, characterized by the fact that it comprises the following stages:

- a first stage wherein a stack of semifinished parts is fed to a pickoff station;
- a second stage wherein at least two detectors, each having at least two sensors, are moved from a withdrawn idle position to a forward operating position wherein at least some of said sensors cooperate with an edge of the stacked parts; said second stage also comprising a further operation wherein at least two electromagnets of a pickoff device are moved from an idle position into an operating position wherein the electromagnets are positioned adjacent to said stack;
- a third stage wherein the sensors of said detectors supply a signal to a respective position transducer, which in turn emits a signal proportional to the shift of said sensors from a given reference position;
- a fourth stage wherein the signals emitted by said transducers are processed by a control system, and wherein control signals are emitted by said control system in response to said signals from said transducers, and are supplied to a unit for driving a handling fixture for transferring one part at a time from the pickoff station to the forming machine;
- a fifth stage wherein said drive unit sets the handling fixture to an operating position depending on the characteristics and the location of said stack in said pickoff station;
- a sixth stage wherein further control signals are supplied by said drive unit to said handling fixture, for commencing transfer of one part at a time to said forming machine.

BRIEF DESCRIPTION OF THE DRAWINGS

A non-limiting embodiment of the present invention will be described by way of example with reference to the accompanying drawings, in which:

FIG. 4 shows a larger-scale partial section along line IV—IV in FIG. 1;

FIGS. 5a–5d shows various possible configurations of a stack of semifinished parts supplied to the feed unit in FIGS. 1 to 3.

DETAILED DESCRIPTION OF THE INVENTION

Figure 1:
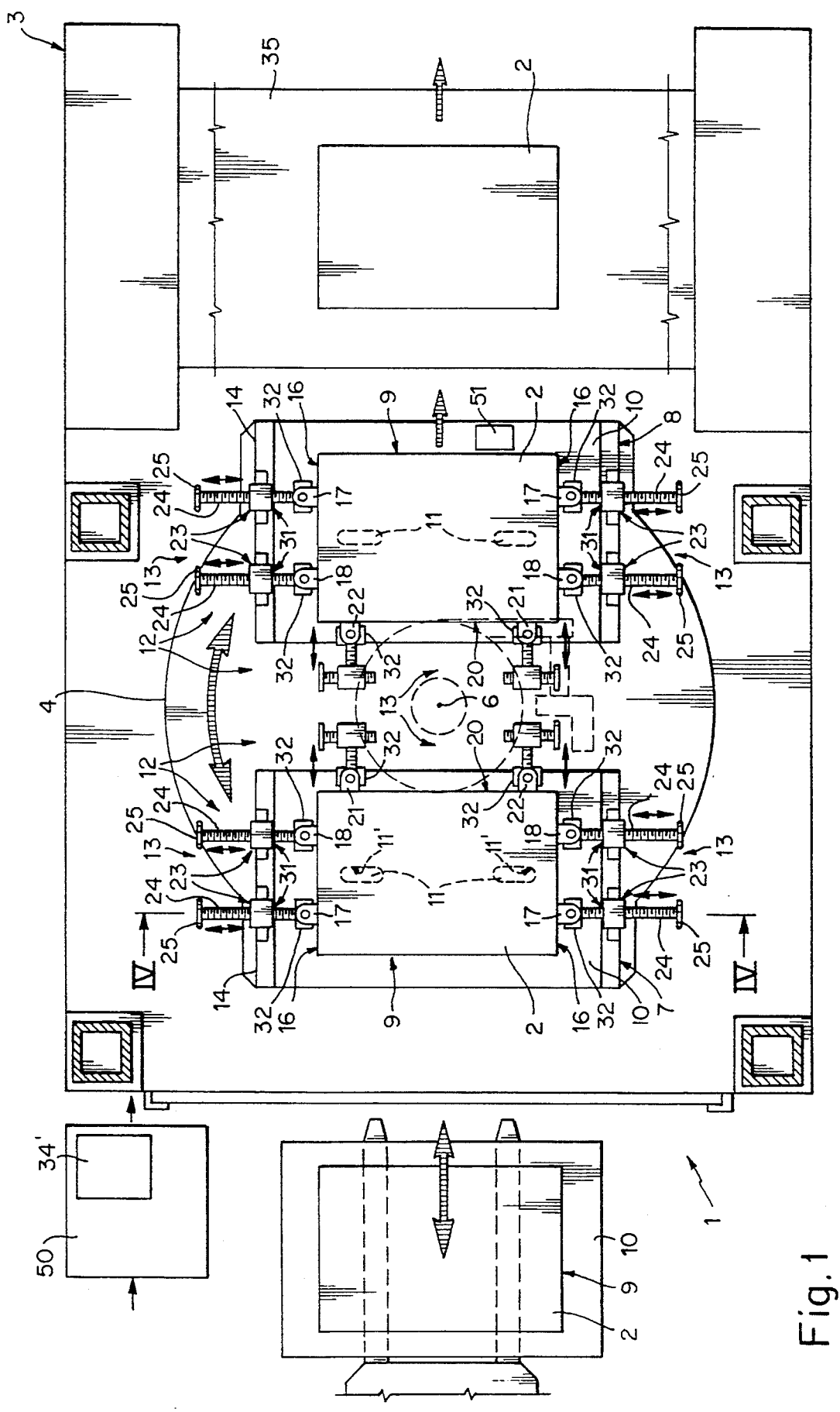
FIG. 1 shows a partial plan view of a preferred embodiment of a unit for feeding semifinished parts on to a press, in accordance with the present invention.
Figure 2:
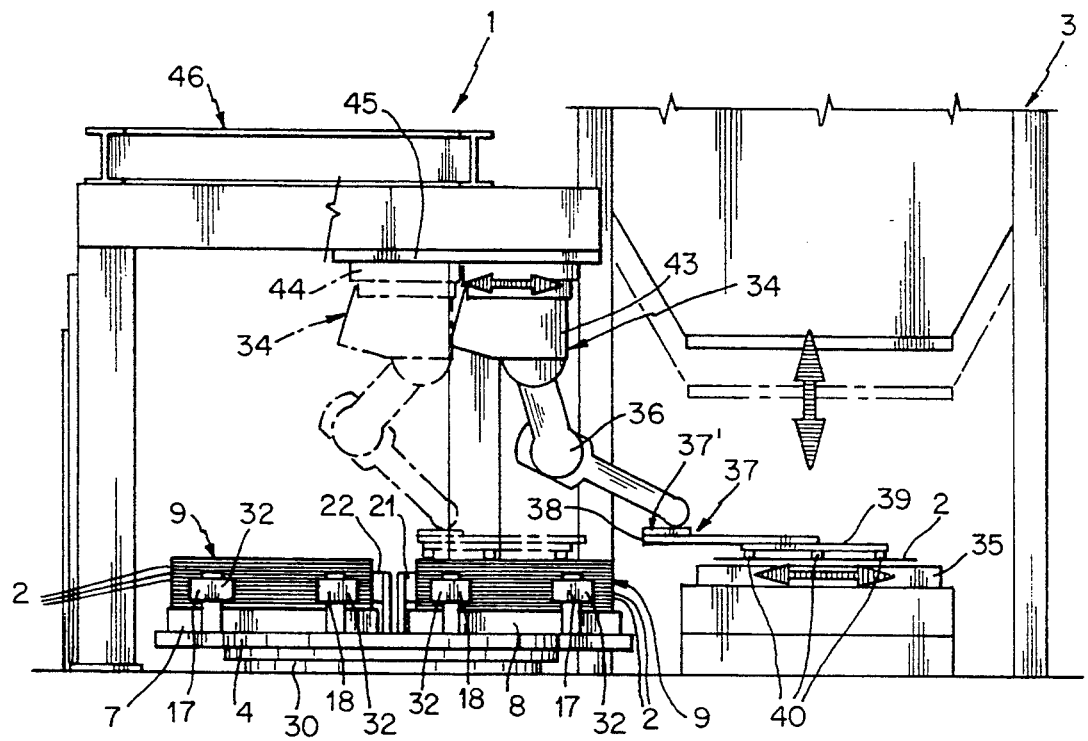
FIG. 2 shows a smaller-scale partial side view of the FIG. 1 feed unit.
Figure 3:
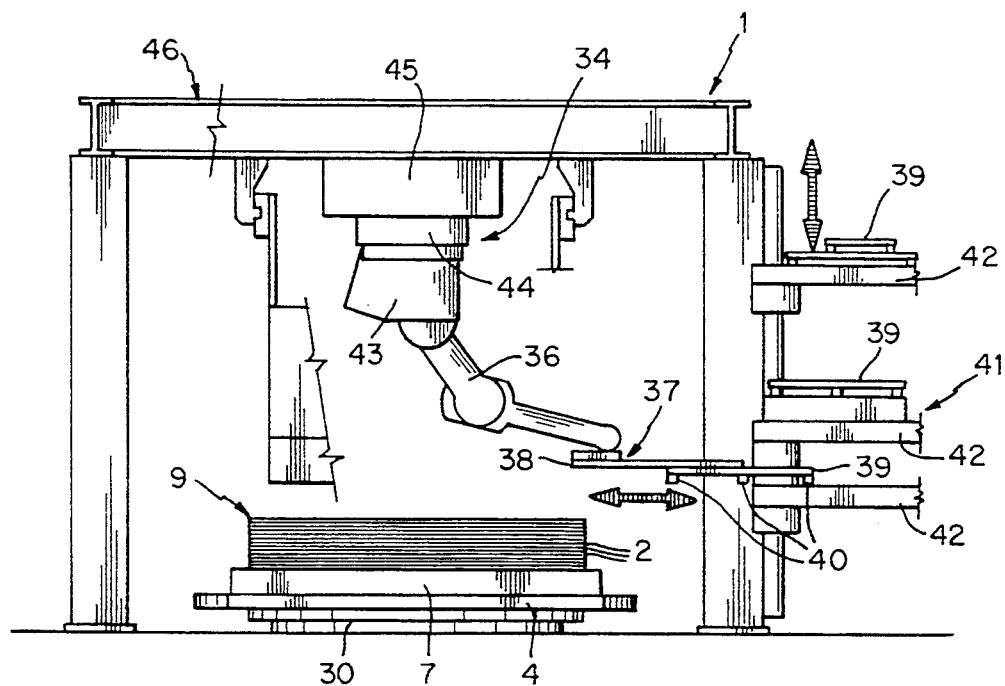
FIG. 3 shows a smaller-scale front view, with parts removed for simplicity, of the FIG. 1 feed unit.

Number 1 in FIGS. 1 to 3 indicates a unit for feeding semifinished parts 2, normally stacked flat blanks, on to a press 3 shown schematically in FIG. 2.

Feed unit 1 comprises a table 4 rotating reciprocatingly about an axis 6 perpendicular to the FIG. 1 plane, and between two diametrically-opposed stop positions corresponding respectively to a loading station and pickoff station. Table 4 comprises two diametrically-opposed platforms 7 and 8 positioned, as table 4 is rotated, alternately and respectively in the loading and pickoff stations.

In use, each platform 7, 8 supports a respective stack 9 of semifinished parts 2 on a pallet 10 (FIG. 1) located in relation to table 4 by a pair of projections 11 on platforms 7, 8, each engaging a respective seat 11' formed in pallets 10.

As shown in FIG. 1, each platform 7, 8 presents a device 12 for detecting the position and characteristics of stack 9, and comprising a number of pairs 13 of appropriately spaced position detectors substantially adjacent to edge 14 of platform 7, 8. More specifically, supposing, purely by way of example, that each part 2 is rectangular, as shown in FIG. 1. In this case, detecting device 12 comprises three pairs 13 of detectors (FIG. 1), two located on either side of and facing a respective lateral wall 16 of respective stack 9 and each comprising two adjacent detectors 17 and 18, and the third located between platforms 7 and 8, facing lateral wall 20 of stack 9, and also comprising two adjacent detectors 21 and 22.

As shown in FIG. 1, each of detectors 17, 18, 21 and 22 is fitted to respective platform 7, 8 so as to move between a withdrawn idle position wherein it is located substantially outwards of respective platform 7, 8, and a forward position wherein it cooperates with respective lateral wall 16, 20 of stack 9.

As shown in FIGS. 1 and 4, each of detectors 17, 18, 21 and 22 is moved to and from the operating position via a screw-nut screw system 23 comprising a control screw 24 preferably operated manually via a handwheel 25. As shown particularly in FIG. 4, each of detectors 17, 18, 21 and 22 comprises a head 26 in turn comprising a pair of superimposed, spaced position sensors or feelers 27 and 28, each with a respective position transducer 26'.

According to a first variation (not shown), each of detectors 17, 18, 21 and 22 is moved between said withdrawn and forward positions via servomeans, e.g. pneumatic or hydraulic; and, according to a second variation (not shown), instead of being connected to respective platform 7, 8 so as to move together with table 4, detectors 17, 18, 21 and 22 are connected to a structure 30 (FIGS. 2 and 3) supporting table 4, and are moved between an extracted position corresponding to the operating position described above, and a withdrawn position beneath, and enabling rotation of, table 4.

As shown in FIG. 1, each platform 7, 8 also comprises a pickoff device 31 for detaching parts 2 from stack 9, and comprising a number of electromagnets 32, each integral with a respective detector 17, 18, 21, 22 and moving between a withdrawn idle position and a forward operating position adjacent to the edge of parts 2.

Alternatively, according to a further embodiment (not shown), each electromagnet 32 is connected to respective platform 7, 8, and is moved to and from the edge of parts 2 independently of the position assumed by detectors 17, 18, 21, 22.

As shown in FIGS. 2 and 3, feed unit 1 also comprises a robot handling fixture 34 adjacent to, and preferably over, the pickoff station, for transferring parts 2 one at a time to die 35 of press 3.

Again with reference to FIGS. 2 and 3, handling fixture 34 comprises an articulated arm 36 rotated about six axes by the; drive unit 34' (FIG. 1) of fixture 34; and a gripping member indicated as a whole by 37.

Gripping member 37 comprises a first element 38 connected to the wrist of fixture 34 and supporting a powered carriage (not shown); and a second element 39 connected to the carriage (not shown) by a fast-fit device 37' (FIG. 2) so as to move to and from press 3 in relation to first element 38.

Second element 39 presents a number of suction cups 40 arranged so as to cover the surface of part 2 for pickup, and spring-mounted so as to enable troublefree grip and detachment of the picked up part 2. Preferably, a first group (not shown) of suction cups 40 is so arranged as to cooperate with a substantially peripheral portion of part 2, while a second group cooperates with the central portion of part 2. Such an arrangement of suction cups 40 provides, when gripping part 2, for curving it slightly inwards and so assisting detachment from the underlying part 2.

Fast-fit device 37' for connecting said first and second elements 38 and 39 provides for troublefree changeover of second element 39, the geometry and design of which varies according to the size of part 2. For further assisting changeover of second element 39, the feed unit presents a store 4.1 movable to and from press 3, and having a number of shelves 42, each supporting two or more different second elements 39 accessible automatically by arm 36 of fixture 34 via drive unit 34'.

Gripping unit 37 also comprises a control device (not shown), preferably on first element 38 of gripping unit 37, for detecting and removing two parts 2 picked up simultaneously, and so preventing stoppage of the loading cycle. Finally, gripping unit 37 presents a number of spray nozzles (not shown), preferably on the wrist of handling fixture 34, for lubricating selected portions of the next part 2, preferably during the forward or work stroke of gripping unit 37.

As shown in FIG. 2, the base 43 of fixture 34 is fitted integral with a slide 44 running axially along a rail 45 integral with a supporting structure 46, so as to enable fixture 34 to travel between the pickup and loading positions shown respectively by the dotted and continuous lines in FIG. 2, and so increase the speed at which parts 2 are fed on to press 3.

Finally, the transfer unit comprises a control system 50 (FIG. 1) in turn comprising, in addition to drive unit 34' of fixture 34, a memory for storing ideal or reference operating parameters; and a processing unit for emitting control signals in response to input signals emitted by device 12 for detecting the position and configuration of stack 9 of parts 2.

In actual use, commencing from the initial stage in the feed cycle, as opposed to the steady-state condition, parts 2 stacked on respective pallet 10 are loaded on to whichever of platforms 7, 8 is currently positioned in the loading station, i.e. on the opposite side of handling fixture 34 in relation to press 3. Detectors 17, 18, 21 and 22 and electromagnets 32 of said platform 7 or 8 are obviously set beforehand to the withdrawn idle position, and pallet 10 is located on platform 7, 8 by engaging projections 11 inside respective seats 11'. Detectors 17, 18, 21 and 22 and electromagnets 32 are then moved from the idle to the operating position, i.e. contacting respective walls 16, 20 of stack 9, by means of handwheels 25. At this point, if stack 9 is substantially parallelepiped (assuming parts 2 are rectangular), and presents, on pallet 10, no angular or axial displacement in relation to a reference position 48 (shown by the dotted line in FIG. 5a) stored in an operating map (not shown) forming part of the memory of control system 50, position sensors 27 and 28, detecting no variation in the position or geometry of stack 9, permit a first control signal to be supplied to an actuating unit (not shown) for rotating table 4 substantially 180° and so moving said platform 7, 8 with stack 9 into the pickoff station. At this point, a second control signal is supplied to electromagnets 32, which are moved into the operating position, and a further signal is supplied for activating handling fixture 34 and commencing transfer of one part 2 at a time to press 3.

During the transfer stage, a second stack 9 of parts 2 is loaded on to the other of platforms 7, 8 now positioned, subsequent to rotation of table 4 as described above, in the loading station, and the same operations for locating and determining the geometric parameters of stack 9 are repeated as for the previous stack. As the last part 2 in stack 9 in the pickoff station is withdrawn, a signal is emitted by a sensor 51 (FIG. 1), and control system 50 disables the handling fixture and emits a control signal for rotating table 4 and so moving the next stack 9 from the loading station to the pickoff station.

At this point, two situations are possible.

Firstly, the second stack 9 presents the same geometric parameters as the first, so that no change is required in the operating configuration of handling fixture 34, which may thus continue the transfer cycle as before.

Secondly, the geometric characteristics of the second stack 9 differ from those of the first (FIGS. 5b, 5c), or the stack is positioned in other than the ideal reference position (FIG. 5d) in relation to platform 7, 8.

In the event stack 9 presents, for example, a lateral shift in relation to the vertical, as shown in FIG. 5b, sensors 27 and 28 of the pair 13 of detectors facing wall 20 of stack 9 fail to cooperate simultaneously with wall 20, and so emit a signal proportional to the shift in relation to a zero position corresponding to the ideal position of stack 9 and shown graphically in FIG. 5b by line B. If K and h are the signals emitted respectively by sensors 27 and 28 in relation to line B and as shown graphically in FIG. 5b, the slope angle $\alpha$ of stack 9 may be determined easily by virtue of the distance L between sensors 27 and 28 being known. With reference to FIG. 5b, in fact, $TAN\alpha=(K-h)/L$. The resulting angle $\alpha$ thus represents a regulating parameter, which, at this point, is converted by control system 50 into a negative feedback signal and sent to drive unit 34' of handling fixture 34 for defining a new zero position of gripping unit 37 of fixture 34, which may thus transfer parts 2 within the tolerance range of the die on press 3.

The same obviously also applies as regards the position of stack 9 in relation to platform 7, 8.

FIG. 5d shows a plan view of stack 9 rotated in relation to reference position 48, e.g. about an axis parallel to axis Z and intersecting barycentric axis 49.

In this case, if we consider one of the pairs 13 of detectors facing wall 16 of stack 9, and if A and C are the plan projections of wall 16 in the ideal and rotated positions respectively, the two projections intersect at a point P located at distance a from detector 18 and distance b from detector 17. In the FIG. 5d configuration, sensors 27, 28 (FIG. 1) of the same detector 17, 18 will detect the same variation in position by virtue of cooperating simultaneously with surface 16, whereas those of different detectors will cooperate at different times with surface 16, and so emit a signal proportional to the shift in relation to a zero position corresponding to the ideal position of stack 9 as shown graphically by line A. If y1 and y2 are the signals emitted respectively by detectors 18 and 17 in relation to line A and as shown graphically in FIG. 5d, angle $\beta$ may easily be determined according to the following equations:

$$|a+b=D$$

$$|TAN\ \beta=y1/a=y2/b$$

where D is the distance between detectors 17 and 18. Angle $\beta$ thus represents a further regulating parameter which, at this point, is also converted into a signal and sent to drive unit 34' of handling fixture 34 for defining a new zero position of gripping unit 37 of fixture 34 as a function of the configuration of stack 9.

Obviously, if stack 9 is rotated about any axis parallel to axis Z, a further rotation angle of stack 9 must be known for determining the new zero position, more specifically, the rotation angle of stack 9 in relation to plane Z-Y. For this purpose, detectors 21 and 22 (FIG. 1) are provided, the signals from which are analyzed as described previously for determining a second angle (not shown) and a second parameter convertible into a second signal for determining the new zero position of gripping unit 37.

Finally, by appropriately combining the elementary calculations of the zero position of gripping unit 37, handling fixture 34 may be adapted continuously for catering to any configuration of stack 9 and any position assumed by the stack in relation to pallet 10. More specifically, in addition to shifting of the stack in relation to the ideal vertical position, fixture 34 may al so be adapted to stacks 9 twisted as shown schematically in FIG. 5c.

The advantages of feed unit 1 will be clear from the foregoing description. Firstly, it is extremely compact and may thus be employed on any production line and, more specifically, connected to existing on-line presses 3. Secondly, it presents a high degree of flexibility and reliability, by virtue of featuring a detecting device 12 cooperating with a control system 50 having a drive unit 34' for handling fixture 34 and designed to reposition gripping unit 37 of fixture 34 as a function of both the position of stack 9 in relation to platform 7, 8, and the geometric characteristics of the stack.

Thirdly, it is extremely fast operating, by virtue of being so designed as to eliminate the intermediate stage previously required for locating each part 2, and by virtue of handling fixture 34 not only featuring an arm 36 with a relatively high degree of operating freedom, but also being mounted on a slide 44 for moving to and from press 3.

Fourthly, the design of gripping unit 37 provides for further increasing the traveling speed of part 2 in relation to arm 36 of fixture 34, thus enabling a further reduction in cycle time.

Finally, unit 1 as described above is relatively cheap to produce and run, by virtue, firstly, of featuring only one handling device 34, and, secondly, of comprising a low-cost, highly reliable indexing table 4.

To those ,skilled in the art it will be clear that changes may be made to feed unit 1 as described and illustrated herein without, however, departing from the scope of the present invention. In particular, detectors 17, 18, 21 and 22 may differ in number and be arranged differently from those described herein. For example, in the case of substantially rectangular parts 2, detectors may be located on each side of part 2, for enhancing the precision of detecting device 12. Also, detectors 17, 18, 21 and 22 may be designed differently, e.g. with a different number of sensors 27, 28, or a different arrangement of sensors 27, 28 inside respective head 26.

We claim:

1. A unit for feeding semifinished parts on to a forming machine, said unit comprising:
   pickoff means for withdrawing one part at a time off a stack at a pickoff station;
   first transfer means for transferring said part from said pickoff station to the forming machine;
   means for detecting variation in a position or a geometry of said stack with respect to a stored reference position of said stack itself;
   control and processing means for generating a signal for controlling said first transferring means in response to an input signal from said detecting means;
   a station for loading said stack of parts;
   second transfer means for transferring at least one stack at a time from said loading station to said pickoff station,
   wherein said detecting means are movably fitted to said second transfer means so as to move together with and in relation to said second transfer means between an idle position and an operating position wherein said detecting means are in contact with said stack of said parts.

2. A unit as claimed in claim 1, wherein said detecting means is moveably fitted to a supporting means, fixed in relation to said second transfer means, so as to move between an idle position outwards of said second transfer means and an operating position contacting said stack of said parts.

3. A unit as claimed in claim 1, wherein said second transfer means is an indexing table rotating between said loading station and said pickoff station.

4. A unit as claimed in claim 3, wherein said indexing table includes at least two diametrically-opposed platforms, each platform supporting at least one said stack of parts, and each platform including first means for mating with a second means for mating on a pallet supporting said stack of parts; and
   wherein said detecting means is movably fitted to said table so as to rotate with said table, and is located substantially adjacent to an edge of each said platform.

5. A unit as claimed in claim 1, wherein said detecting means includes a number of deflectors, each detector comprising at least a pair of sensors cooperating with said stack of parts and having a respective position transducer means.

6. A unit as claimed in claim 1, wherein said pickoff means includes a plurality of electromagnets, each electromagnet moveable between a withdrawn idle position and a forward operating position adjacent to an edge of said stack of parts.

7. A unit as claimed in claim 1, wherein said first transfer means is a robot handling fixture mounted on a slide so as to move to and from said forming machine.

8. A unit as claimed in claim 7, wherein said robot handling fixture includes a gripping unit having a first element connected to a wrist of said robot handling fixture, and a second element slidably fitted to said first element so as to move in relation to the first element to and from said forming machine.

9. A unit as claimed in claim 8, wherein said first and second elements are mutually connected by a fast-fit device.

10. A unit as claimed in claim 8, wherein said gripping unit further comprises a number of nozzles for feeding fluid on to a surface of a next part for pickup.

11. A unit as claimed in claim 8, further comprising a store housing a number of said second elements which said robot handling fixture accesses to change the second element.

12. A unit as claimed in claim 11, wherein said store is moveable to and from said forming machine.

13. A method of feeding semifinished parts to a forming machine, comprising the steps of:
   feeding a stack of semifinished parts to a pickoff station;
   moving, together with and in relation to the means for feeding, at least two detectors, each having at least two sensors, from a withdrawn idle position to a forward operating position wherein at least some of said sensors cooperate with an edge of the stacked parts;
   moving at least two electromagnets of a pickoff device from a idle position into an operating position wherein the electromagnets are positioned adjacent to said stack;
   outputting, from the sensors of said detectors, a signal proportional to the shift of said sensors from a stored reference position;
   processing the signals with a control system, and outputting control signals to a means for transferring one part, at a time, from the pickoff station to the forming machine;
   setting the transferring means to an operating position in response to the control signals which are indicative of a location of said stack in said pickoff station; and
   outputting further control signals to said transferring means for commencing transfer of one part, at a time, to said forming machine.

14. A method as claimed in claim 13, further comprising the steps of:
   supplying a second stack of parts to a loading station;
   detecting withdrawal of a last part in said pickoff station, and disabling the transferring means until the second stack of parts is fed to the pickoff station; and
   simultaneously generating a signal for transferring said stack from the loading station to the pickoff station.

15. A method of feeding semifinished parts to a forming machine, comprising the steps of:
   (a) feeding a stack of semifinished parts to a pickoff station;
   (b) moving at least two detectors, each having at least two sensors, from a withdrawn idle position to a forward operating position wherein at least some of said sensors cooperate with an edge of the stacked parts;
   (c) moving at least two electromagnets of a pickoff device from a idle position into an operating position wherein the electromagnets are positioned adjacent to said stack;
   (d) outputting, from the sensors of said detectors, a signal proportional to the shift of said sensors from a stored reference position;
   (e) processing the signals with a control system, and outputting control signals to a means for transferring one part, at a time, from the pickoff station to the forming machine;

(f) setting the transferring means to an operating position in response to the control signals which are indicative of a location of said stack in said pickoff station;

(g) outputting further control signals to said transferring means for commencing transfer of one part, at a time, to said forming machine;

(h) supplying a second stack of parts to a loading station;

(i) detecting withdrawal of a last part in said pickoff station, and disabling the transferring means until the second stack of parts is fed to the pickoff station; and (j) simultaneously, generating a signal for feeding the second stack from the loading station to the pickoff station.

* * * * *